(12) United States Patent
Takizawa et al.

(10) Patent No.: US 9,873,479 B2
(45) Date of Patent: *Jan. 23, 2018

(54) HYDRAULIC DISC BRAKE CALIPER WITH ONE WAY PLUMBING

(71) Applicant: SHIMANO INC., Sakai, Osaka (JP)

(72) Inventors: Shinichi Takizawa, Sakai (JP); Osamu Kariyama, Sakai (JP); Kenichi Kikuno, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 890 days.

This patent is subject to a terminal disclaimer.

(21) Appl. No.: 13/758,830

(22) Filed: Feb. 4, 2013

(65) Prior Publication Data
US 2013/0146403 A1 Jun. 13, 2013

Related U.S. Application Data

(63) Continuation of application No. 12/205,064, filed on Sep. 5, 2008, now Pat. No. 8,365,878, and a continuation-in-part of application No. 12/027,944, filed on Feb. 7, 2008, now abandoned.

(51) Int. Cl.
*F16D 55/228* (2006.01)
*B62L 1/00* (2006.01)
*F16D 55/00* (2006.01)
*F16D 121/02* (2012.01)

(52) U.S. Cl.
CPC ............ *B62L 1/005* (2013.01); *F16D 55/228* (2013.01); *F16D 2055/002* (2013.01); *F16D 2121/02* (2013.01)

(58) Field of Classification Search
USPC .............................. 188/71.6, 71.5, 72.5, 72.4
See application file for complete search history.

(56) References Cited

U.S. PATENT DOCUMENTS

| | | | | |
|---|---|---|---|---|
| 3,420,342 A | * | 1/1969 | Botterill | 188/264 F |
| 4,799,575 A | * | 1/1989 | Kroniger | 188/71.6 |
| 5,350,223 A | * | 9/1994 | Stewart, Jr. | 303/84.2 |
| 5,445,242 A | * | 8/1995 | Pogorzelski et al. | 188/71.6 |
| 5,515,948 A | * | 5/1996 | Gilliland | 188/72.5 |
| 5,558,183 A | * | 9/1996 | Way | 188/71.6 |

(Continued)

FOREIGN PATENT DOCUMENTS

| | | |
|---|---|---|
| EP | A-0268764 | 6/1988 |
| EP | A-1998066 | 12/2008 |
| WO | WO0174637 | 10/2001 |

OTHER PUBLICATIONS

Response filed on Jul. 10, 2012 to USPTO Office Action dated Apr. 12, 2012, in related U.S. Appl. No. 12/027,944.

(Continued)

*Primary Examiner* — Thomas J Williams
*Assistant Examiner* — James Hsiao
(74) *Attorney, Agent, or Firm* — Jeffer Mangels Butler & Mitchell LLP; Brennan C. Swain, Esq.

(57) ABSTRACT

A hydraulic disc brake caliper housing that includes first and second side portions and first and second end portions that cooperate to define a fluid path defined therein that extends between a fluid inlet and a fluid outlet. The fluid path extends from the fluid inlet, through the second side portion, through the first end portion, through the first side portion and to the fluid outlet.

2 Claims, 18 Drawing Sheets

(56) References Cited

U.S. PATENT DOCUMENTS

| | | | |
|---|---|---|---|
| 5,560,457 A | 10/1996 | Rike | |
| 6,164,421 A * | 12/2000 | Nakamura et al. | 188/71.5 |
| 6,321,880 B2 * | 11/2001 | Nakamura | 188/71.6 |
| 6,386,333 B1 * | 5/2002 | Russell | 188/71.6 |
| 6,401,882 B1 * | 6/2002 | Ueda et al. | 188/264 G |
| 6,471,144 B1 | 10/2002 | Huang | |
| 6,527,089 B2 | 3/2003 | Lumpkin | |
| 6,607,057 B2 | 8/2003 | Lumpkin | |
| 6,648,104 B1 * | 11/2003 | Buckley et al. | 188/71.6 |
| 7,073,875 B2 * | 7/2006 | Bass | 303/114.1 |
| 7,353,920 B2 * | 4/2008 | Nowak et al. | 188/71.6 |
| 7,484,600 B2 * | 2/2009 | Watarai | 188/26 |
| 7,597,178 B2 | 10/2009 | Dennis | |

OTHER PUBLICATIONS

USPTO Office Action dated Apr. 12, 2012, in related U.S. Appl. No. 12/027,944.
Response filed on Mar. 7, 2012 to USPTO Office Action dated Dec. 7, 2011, in related U.S. Appl. No. 12/027,944.
USPTO Office Action dated Dec. 7, 2011, in related U.S. Appl. No. 12/027,944.
Response filed Nov. 22, 2011 to USPTO Office Action dated Aug. 25, 2011, in related U.S. Appl. No. 12/027,944.
USPTO Office Action dated Aug. 25, 2011, in related U.S. Appl. No. 12/027,944.
Response filed Jul. 22, 2011 to USPTO Office Action dated Apr. 29, 2011, in related U.S. Appl. No. 12/027,944.
USPTO Office Action dated Apr. 29, 2011, in related U.S. Appl. No. 12/027,944.
Response filed Apr. 15, 2011 to USPTO Office Action dated Feb. 4, 2011, in related U.S. Appl. No. 12/027,944.
USPTO Office Action dated Feb. 4, 2011, in related U.S. Appl. No. 12/027,944.
Response filed Jan. 12, 2011 to USPTO Office Action dated Oct. 19, 2010, in related U.S. Appl. No. 12/027,944.
USPTO Office Action dated Oct. 19, 2010, in related U.S. Appl. No. 12/027,944.
Response filed Jul. 3, 2012 to USPTO Office Action dated Apr. 3, 2012, in related U.S. Appl. No. 12/205,064.
USPTO Office Action dated Apr. 3, 2012, in related U.S. Appl. No. 12/205,064.
Response filed Feb. 13, 2012 to USPTO Office Action dated Sep. 13, 2011, in related U.S. Appl. No. 12/205,064.
USPTO Office Action dated Sep. 13, 2011, in related U.S. Appl. No. 12/205,064.
Response filed Apr. 29, 2011 to USPTO Office Action dated Feb. 2, 2011, in related U.S. Appl. No. 12/205,064.
USPTO Office Action dated Feb. 2, 2011, in related U.S. Appl. No. 12/205,064.
SAINT Braking System Technical Service Instructions (SI-8CZ0E) published by Shimano Inc. in May 2005.

* cited by examiner

HYDRAULIC DISC BRAKE CALIPER WITH ONE WAY PLUMBING

CROSS REFERENCE TO RELATED APPLICATIONS

This application is a continuation of U.S. patent application Ser. No. 12/205,064, filed Sep. 5, 2008, which is a continuation-in-part of U.S. patent application Ser. No. 12/027,944, filed Feb. 7, 2008, the entireties of which are incorporated herein by reference.

FIELD OF THE INVENTION

The present invention relates to hydraulic disc brakes, and more particularly, to a hydraulic disc brake caliper with one way plumbing.

BACKGROUND OF THE INVENTION

In recent years, certain high performance bicycles have included hydraulic disc brakes. Hydraulic disc brake systems typically include a caliper housing, a first movable brake pad and a second fixed or movable brake pad. The movable brake pad is typically attached to a piston that is movable in response to fluid pressure applied via a hydraulic fluid conduit in the caliper housing. The brake pads are positioned on either side of a rotor, which is attached to the front or back wheel of a bicycle. Upon the application of fluid pressure to the piston or pistons, the brake pads come into contact with the rotor, thereby applying frictional resistance and causing the bicycle to slow down or stop.

Hydraulic disc brake systems for bicycles are typically actuated by a brake lever attached to a bicycle handlebar. They also typically include a master piston in a master cylinder which is actuated by the brake lever. The master cylinder contains a hydraulic fluid and is in fluid communication with the disc brake caliper via a fluid conduit. The brake pads are typically spaced apart from the rotor by a predetermined gap. As the lever is contracted towards the handlebar, the master piston moves, thereby forcing liquid out of the master cylinder and into a conduit connected to the caliper housing. The movement of fluid into the caliper housing causes the pistons to move, eventually bringing the brake pads into contact with the rotor.

When initially filling the hydraulic disc brake system (including the master cylinder and the caliper), the system must be bled to remove gas bubbles from the system and optimize performance of the brakes. Many prior art calipers include a branched hydraulic fluid pathway therein. In other words, after the fluid enters through the fluid inlet, it branches into two separate conduits, one that goes to one piston and another that goes to the piston on the other side (and another branch to the fluid outlet). This can make bleeding the brakes difficult because the bubbles get caught in the various branches. A need exists for a hydraulic disc brake caliper that is easy to bleed.

SUMMARY OF THE PREFERRED EMBODIMENTS

According to a first aspect of the present invention, there is provided a hydraulic disc brake caliper housing that includes first and second side portions and first and second end portions that cooperate to define a fluid path defined therein that extends between a fluid inlet and a fluid outlet. The fluid path extends from the fluid inlet, through the second side portion, through the first end portion, through the first side portion and to the fluid outlet. In a preferred embodiment, the fluid path is not branched. The first and second side portions each have at least one piston receiving opening defined therein. The fluid is adapted to flow in the non-branched path from the fluid inlet, through the piston receiving opening in the second side portion, through the piston receiving opening in the first side portion and to the outlet. The path can be reversed. For example, the fluid inlet can be located on the first side portion and the fluid outlet can be located on the second side portion.

In accordance with another aspect of the present invention, there is provided a method of filling a hydraulic disc brake caliper with hydraulic fluid. The method includes providing a hydraulic disc brake caliper that comprises a housing that includes a fluid inlet and a fluid outlet and a generally non-branched fluid path defined between the fluid inlet and the fluid outlet. The housing has first and second piston receiving openings defined therein. The method includes the step of flowing fluid through the fluid inlet, through and passed the second piston receiving opening, through and passed the first piston receiving opening and toward the outlet. In a preferred embodiment, the method includes bleeding gas from the fluid in the fluid path. During this step at least a portion of the air travels from adjacent the fluid outlet, passed the first or second piston receiving opening, passed the second or first piston receiving opening and out the fluid inlet.

In accordance with another aspect of the present invention, there is provided a hydraulic disc brake caliper that includes first and second housing halves that cooperate to define a one-way fluid path that extends between a fluid inlet and a fluid outlet, and first and second pistons each received in one of the first and second housing halves. The first and second pistons are in flow communication with one another along the one-way fluid path.

The present invention is applicable to all types of devices and is not limited to bicycles.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Referring initially to FIGS. 1-12, a preferred embodiment of a bicycle disc brake caliper 11 is described. Bicycle disc brake caliper 11 is preferably a hydraulic brake disc caliper operatively connected to a hydraulic brake lever assembly.

It will be appreciated that terms such as "front," "back," "top," "bottom," "side," and the like used herein are merely for ease of description and refer to the orientation of the components as shown in the figures. It should be understood that any orientation of the caliper 11 and the components thereof described herein is within the scope of the present invention.

Figure 1:
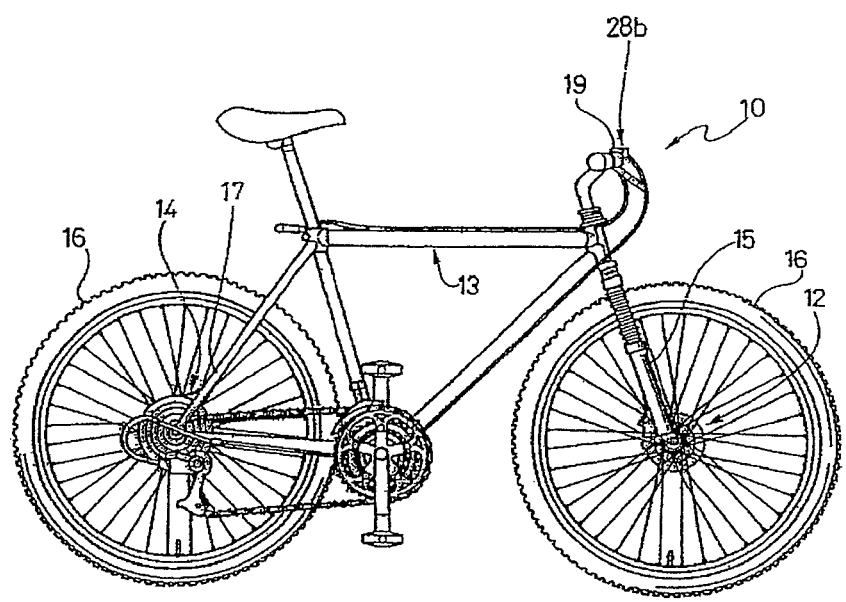
FIG. 1 is a side elevational view of a bicycle with a front disc brake assembly and a rear disc brake assembly in accordance with an embodiment of the present invention.

As shown in FIG. 1, a bicycle 10 with a front disc brake assembly 12 and a rear disc brake assembly 14 is illustrated in accordance with a preferred embodiment of the present invention. Other than the calipers, the front and rear disc brake assemblies 12 and 14 are relatively conventional fluid operated disc brakes fixedly coupled to a frame 13. Therefore, many of the components of the disc brake assemblies 12 and 14 will not be discussed or illustrated in detail herein except as modified by the preferred embodiments of the present invention, as discussed below. Furthermore, it will be understood that the bicycle disc brake caliper 11 can be used with either the front disc brake assembly 12 and a rear disc brake assembly 14.

Specifically, front disc brake assembly 12 is fixedly coupled to a front fork 15 of frame 13, and rear disc brake assembly 14 is fixedly coupled to rear fork 17 of frame 13. Frame 13 includes a handle bar 19 mounted to front fork 15 to steer the bicycle 10. Bicycle 10 includes a pair of wheels 16 rotatably coupled to the bicycle frame 13. One wheel 16 is coupled to front fork 15, and one wheel 16 is coupled to rear fork 17. Each wheel 16 has a disc brake rotor 18 fixedly coupled thereto in a conventional manner.

Figure 2:
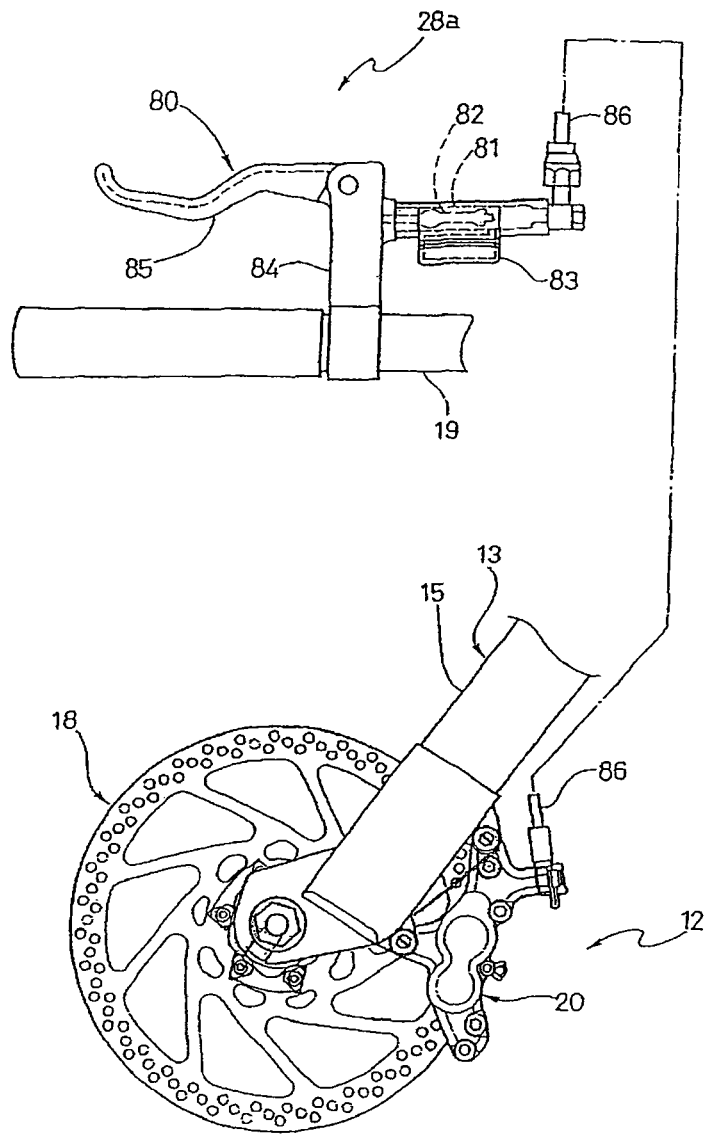
FIG. 2 is a side elevational view of the front disc brake assembly coupled to a front fork and a front disc brake operating mechanism of the bicycle illustrated in FIG. 1.
Figure 3:
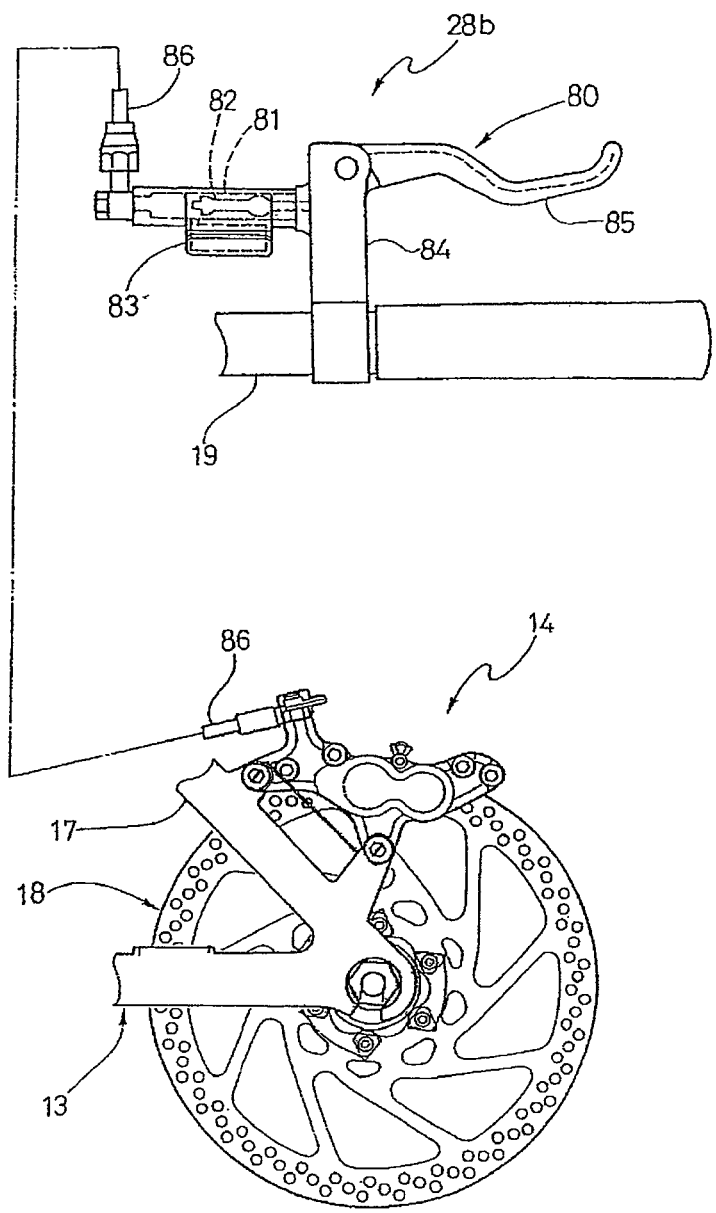
FIG. 3 is a side elevational view of the rear disc brake assembly coupled to a rear fork and a rear disc brake operating mechanism of the bicycle illustrated in FIG. 1.
Figure 4:
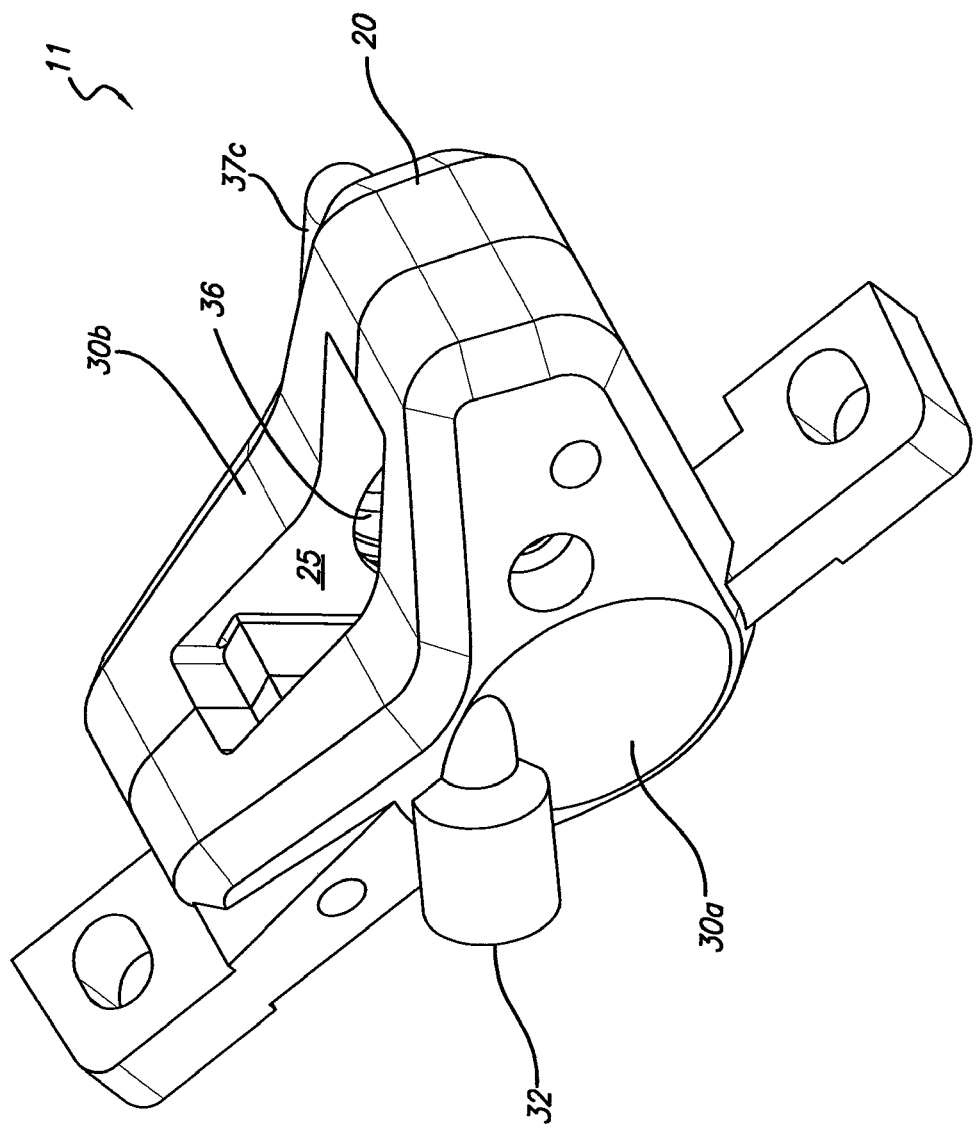
FIG. 4 is a perspective view of a disc brake caliper in accordance with an embodiment of the present invention.

The bicycle 10 and various components thereof are relatively conventional. Therefore, bicycle 10 and its various components will not be discussed or illustrated in detail herein, except as these components relate to bicycle disc brake caliper 11 and front and rear disc brake assemblies 12 and 14 in accordance with the preferred embodiments of the present invention. Moreover, front and rear disc brake assemblies 12 and 14 are substantially identical. Therefore, it will be understood that caliper 11 can be used with both front disc brake assembly 12 or rear disc brake assembly 14. It will further be understood that the front and rear disc brake assemblies 12 and 14 can include calipers 11 that have any number of pistons therein. For example, the calipers 11 shown in FIGS. 2 and 3 are four piston type calipers. However, the calipers 11 shown in FIGS. 4-17 include only two pistons. Accordingly, a caliper with any number of pistons is within the scope of the present invention provided the calipers 11 include one-way plumbing, as described below.

Figure 12:
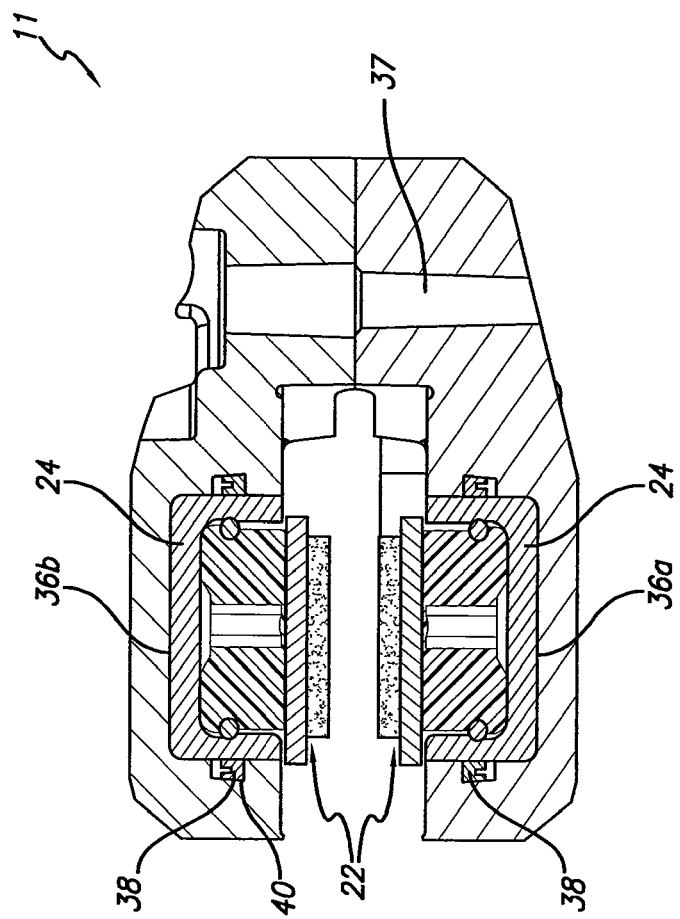
FIG. 12 is a cross-sectional top plan view of the disc brake caliper of FIG. 4 taken along line 12-12 of FIG. 10, which includes the pistons and brake pads.

Front disc brake assembly 12 basically includes caliper 11 and a brake operating mechanism or lever assembly 28a. Caliper 11 includes a caliper housing 20, a pair of friction members 22, and a plurality of pistons 24 disposed in the housing 20 (as shown in FIG. 12). Caliper housing 20 is fixedly coupled to front forks 15 in a conventional manner using threaded fasteners. First and second friction members 22 are coupled to caliper housing 20 to form a rotor receiving slot therebetween. At least one of the friction members 22 is movable relative to caliper housing 20, and preferably both friction members are movable relative to caliper housing 20. At least one piston 24 is movably coupled to caliper housing 20. Preferably, each piston 24 is movably coupled to caliper housing 20.

Referring to FIGS. 4-13, caliper housing 20 is preferably formed of rigid metallic material such as cast aluminum. Caliper housing 20 is formed from a first caliper housing half 30a and a second caliper housing half 30b. First and second caliper housing halves 30a and 30b are fixedly coupled together by a plurality of bolts. First caliper housing half 30a includes a first hole or fluid inlet 32 for receiving a fluid coupling unit (not shown). Caliper housing 20 also includes a second hole or fluid outlet 34 for receiving a bleed valve 35. The first and second holes 32 and 34 can be threaded.

Figure 6:
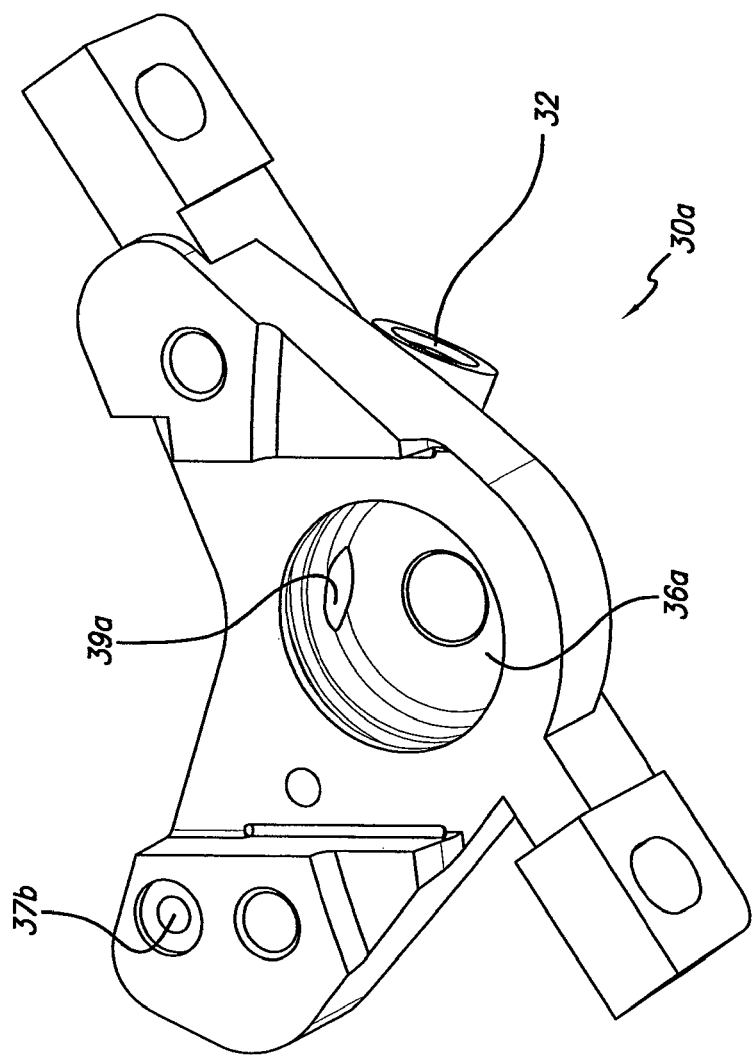
FIG. 6 is an inside perspective view of the first caliper housing half of the disc brake caliper of FIG. 4.
Figure 7:
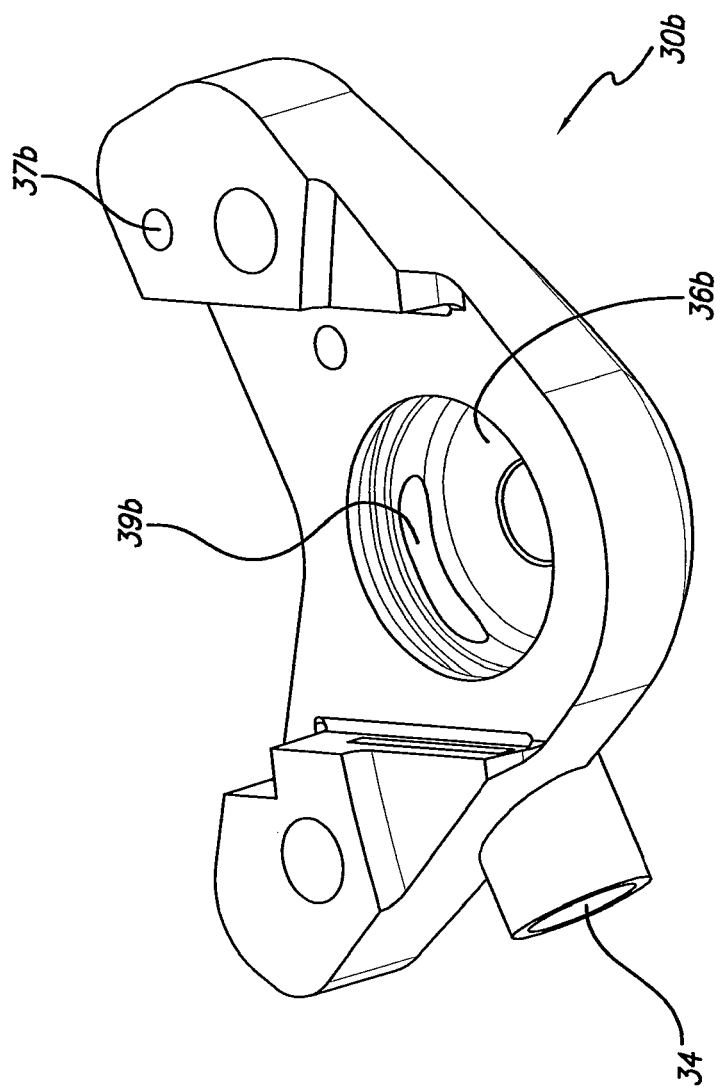
FIG. 7 is an inside perspective view of the second caliper housing half of the disc brake caliper of FIG. 4.
Figure 8:
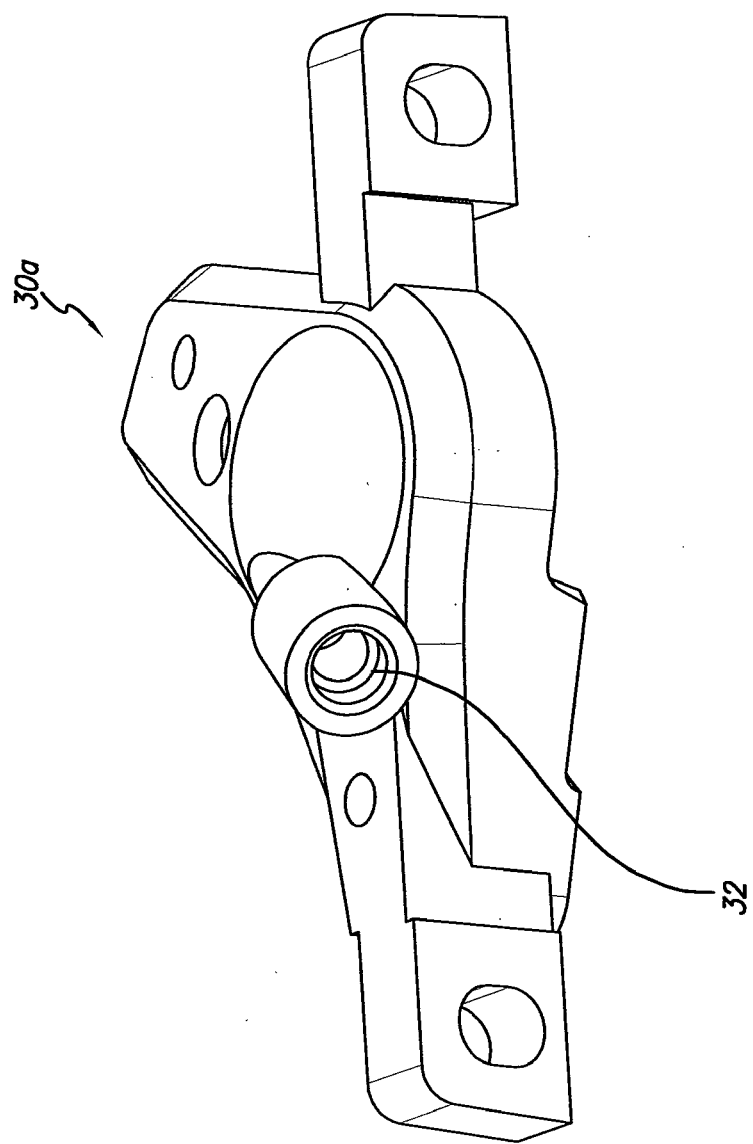
FIG. 8 is an outside perspective view of the first caliper housing half of the disc brake caliper of FIG. 4.
Figure 9:
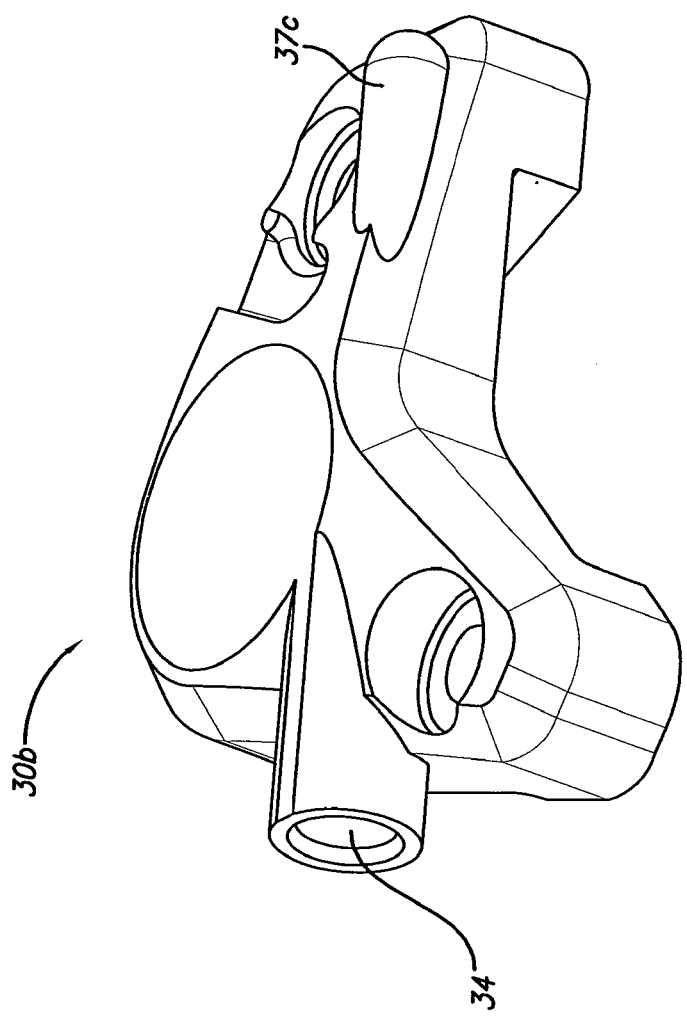
FIG. 9 is an outside perspective view of the second caliper housing half of the disc brake caliper of FIG. 4.
Figure 10:
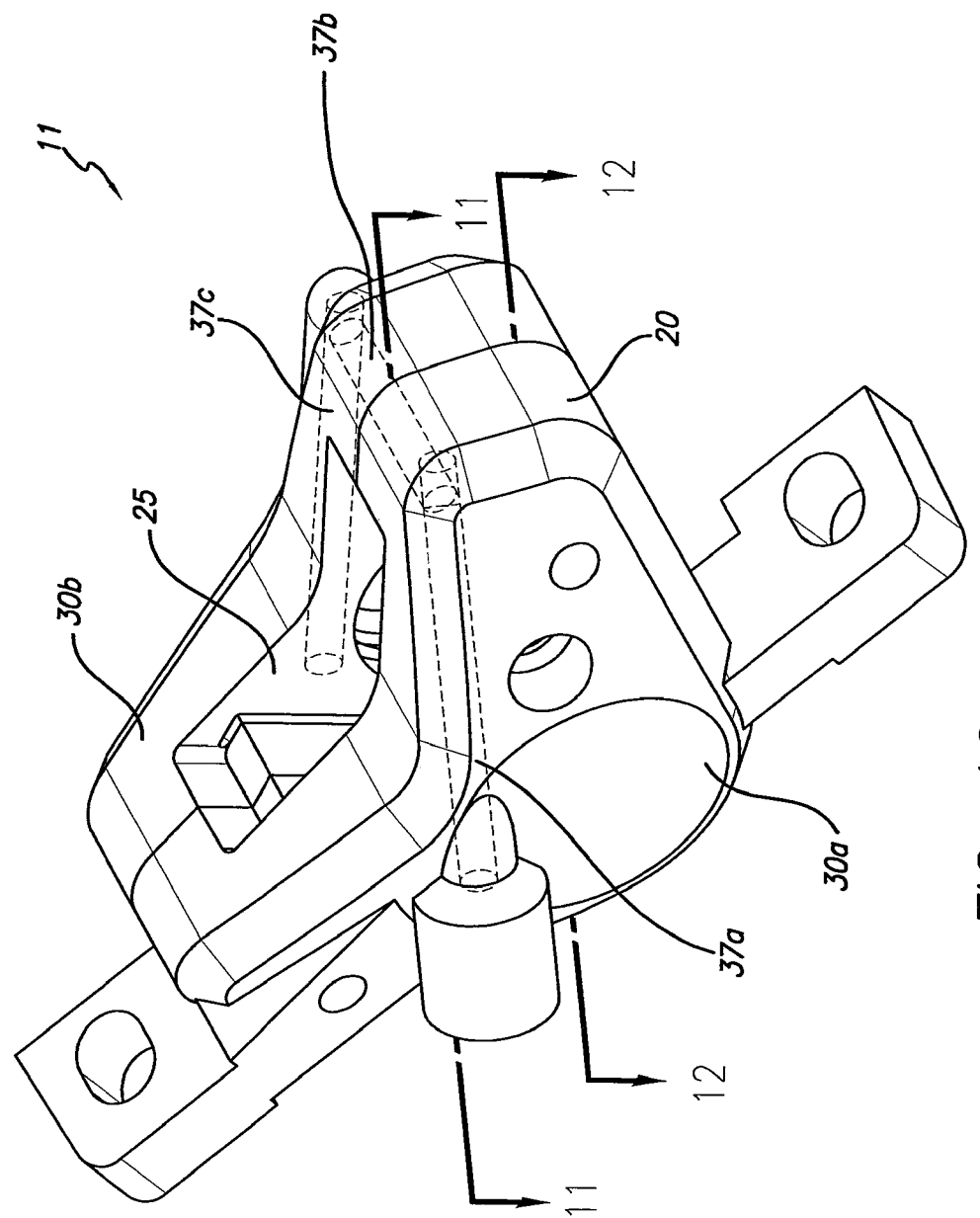
FIG. 10 is a perspective view of the disc brake caliper of FIG. 4 showing the conduits and ports in hidden lines.

Caliper housing 20 preferably includes at least two ports or piston receiving openings 36a and 36b (only two shown). More specifically, each of the first and second caliper housing halves 30a and 30b preferably has a piston receiving opening 36a and 36b formed therein for receiving a piston 24, as shown in FIGS. 6-7. The piston receiving opening 36a or 36b formed in one of caliper housing halves 30a or 30b is arranged to oppose the piston receiving opening 36a or 36b formed in the other one of caliper housing halves 30a or 30b. As shown in FIG. 12, each piston 24 (i.e. mounted in one of the caliper housing halves 30a or 30b) is arranged to move one of the friction members 22 toward disc brake rotor 18 (the braking direction). It will be understood that in an alternative embodiment, the housing 20 can be formed as a single unit.

Each piston receiving opening 36 is preferably an annular opening sized and configured to receive one of the pistons 24 therein. Moreover, each piston receiving opening 36 also preferably includes a circumferential groove 40 for receiving a sealing member 38 for preventing fluid from escaping therefrom.

The seals are annular members formed of a resilient material such as rubber or flexible plastic. Each seal acts to circumferentially seal the internal area of one of the piston receiving openings 36 from the outside of caliper housing 20 when pistons 24 are arranged in piston receiving openings 36. Therefore, when actuating fluid is supplied to piston receiving openings 36, pistons 24 are moved toward rotor 18. Accordingly, friction members 22 are also moved toward disc brake rotor 18 to produce a stopping action on rotor 18, and therefore, wheel 16.

Preferably, caliper housing 20 has two friction members movably coupled thereto, as discussed above. Moreover, friction members are preferably movably coupled to caliper housing 20 such that a rotor receiving slot is formed therebetween. Each friction member basically includes a plate with a friction material fixedly coupled thereto in a conventional manner. Each plate is preferably formed of a rigid metallic material in a conventional manner. Each plate includes a mounting hole for slidably receiving a mounting pin therethrough. Mounting pin is partially threaded at one end and receives a securing member on the opposite end to secure friction members to caliper housing in a conventional manner. Drawings showing these components are shown in U.S. Pat. No. 6,491,144, the entirety of which is incorporated herein by reference.

Figure 5:
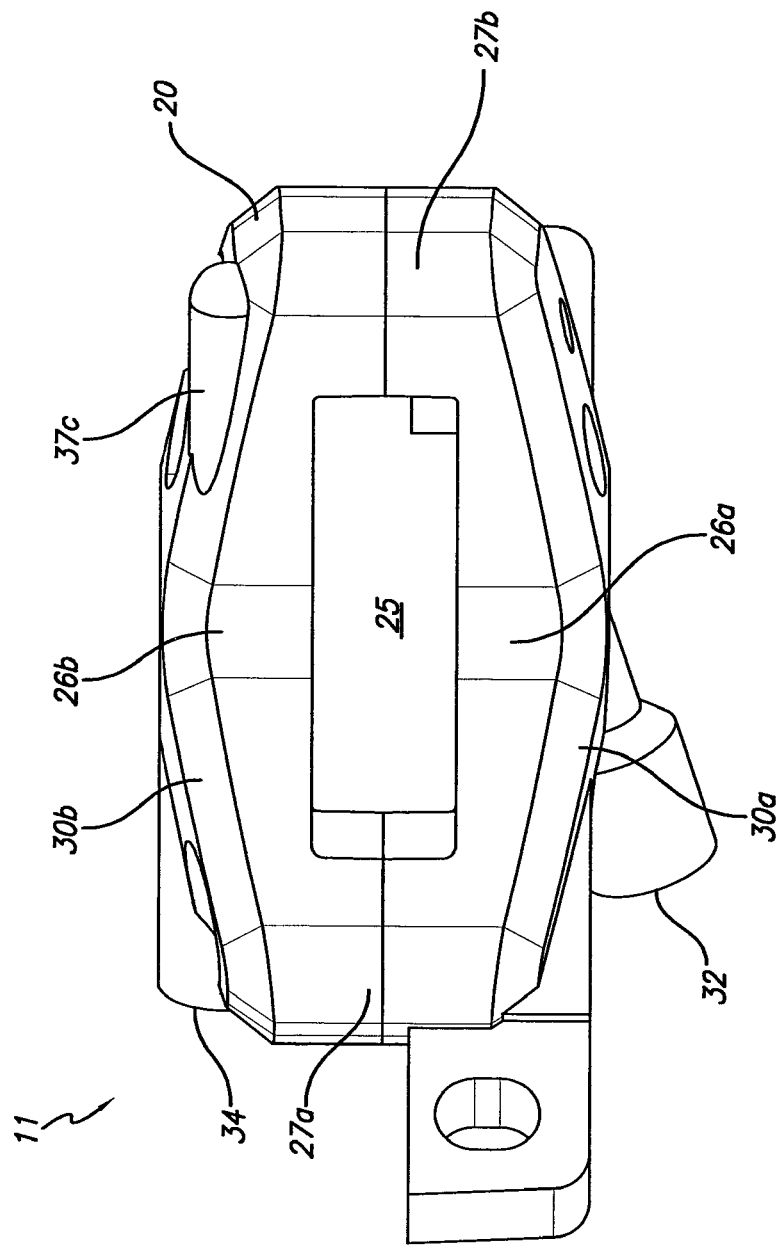
FIG. 5 is a top plan view of the disc brake caliper of FIG. 4.
Figure 11:
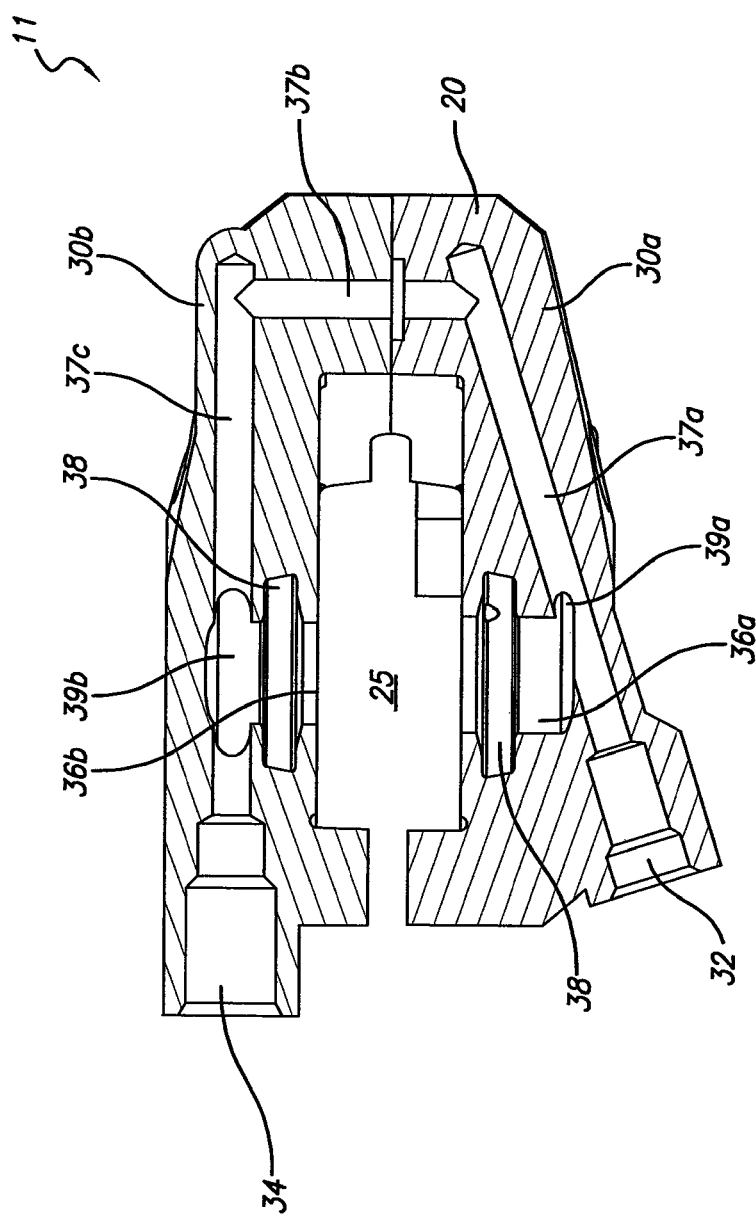
FIG. 11 is a cross-sectional top plan view of the disc brake caliper of FIG. 4 taken along line 11-11 of FIG. 10.

Generally, as is shown in FIGS. 5 and 11, the assembled caliper housing 20 is comprised of four sections or portions, first and second side portions 26a and 26b and first and second end portions 27a and 27b, that cooperate to define a braking opening 25.

Piston receiving openings 36a and 36b are in fluid communication with the fluid coupling unit and a bleed valve (not shown) (via first and second holes 32 and 34) via a network of fluid conduits 37. Thus, when actuating/hydraulic fluid is supplied to caliper housing 20, the actuating fluid flows through the network of conduits 37a, 37b and 37c and into the piston receiving openings 36. For ease of description and because the conduits 37a, 37b and 37c operate in generally the same manner, the conduits may be referred to herein generically without the "a," "b," etc. suffix (same with the piston receiving openings 36a and 36b). For example, the conduits may be referred to individually as first conduit 37a, second conduit 37b or third conduit 37c or they may be referred to generically as conduit(s) 37.

As shown in FIG. 11, first conduit 37a extends from first hole 32, passes through the piston receiving opening 36a (see opening 39a in FIG. 6) and into second end portion 27b. In a preferred embodiment, second conduit 37b extends through second end portion 27b in a direction that is generally parallel to the direction that the pistons move (the braking direction). It will be understood that a portion of second conduit 37b is defined in first caliper housing half 30a and another portion of second conduit 37b is defined in second caliper housing half 30b. Conduit 37c extends from second end portion 27b, passes through piston receiving opening 36b (see opening 39b in FIG. 7) and to second opening 34. It will be understood that all of the conduits 37 and piston receiving openings 36 are in fluid flow communication with one another and define a fluid path.

As shown in FIG. 11, when filling the caliper 11 with fluid, fluid is flowed into first opening 32, through first conduit 37a, into piston receiving opening 36a (through opening 39a), through second conduit 37b, through third conduit 37c, into piston receiving opening 36b (through opening 39b), and to second opening 34.

Figure 13:
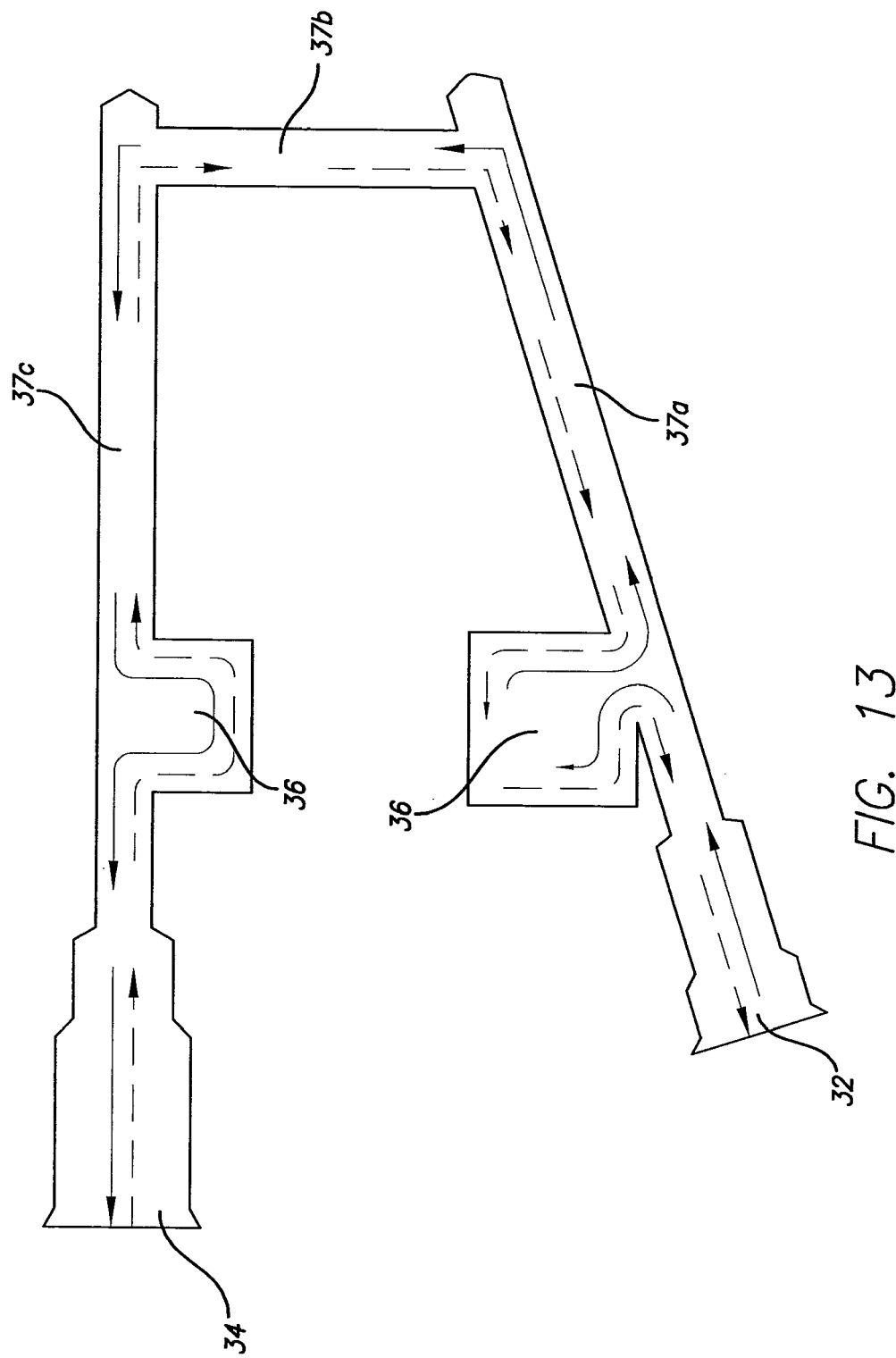
FIG. 13 is a schematic showing the fluid path in the conduits of the disc brake caliper of FIG. 4.
Figure 14:
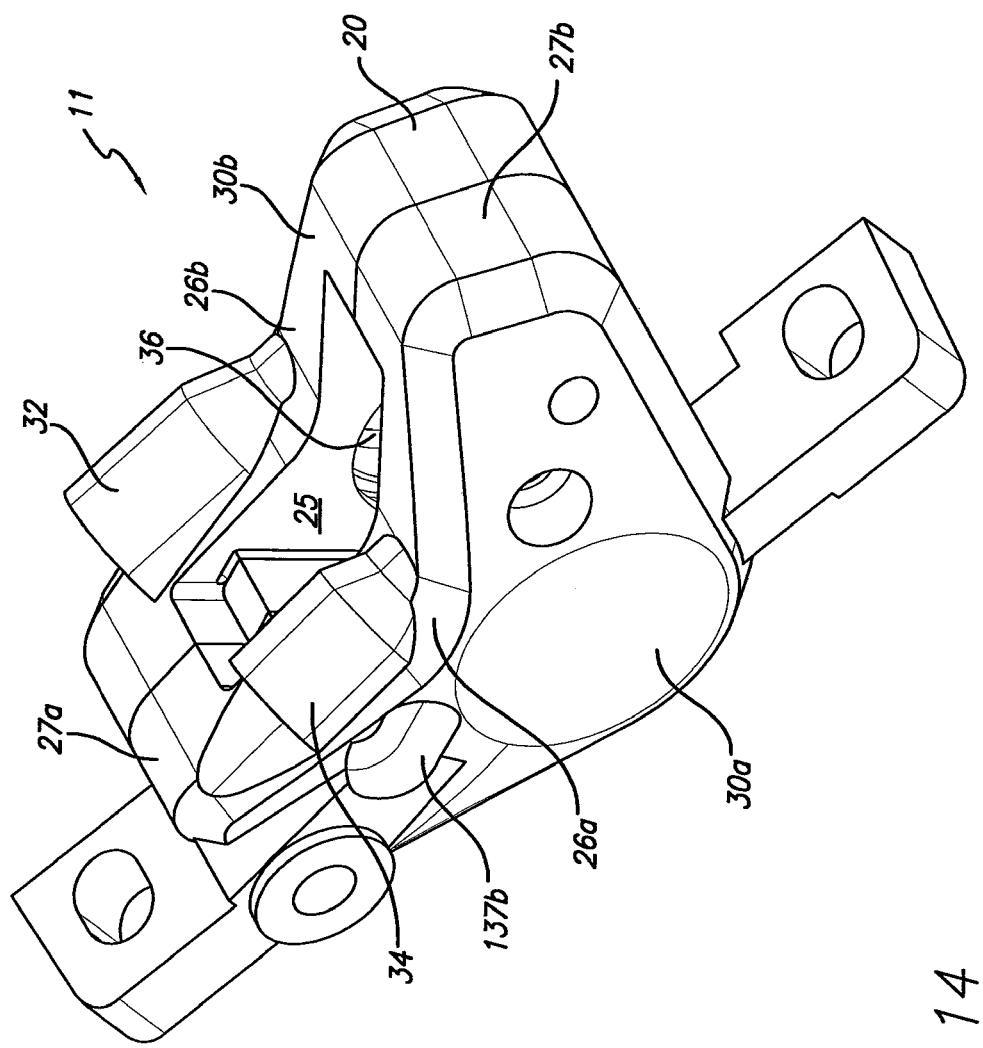
FIG. 14 is a perspective view of a disc brake caliper in accordance with another embodiment of the present invention.
Figure 15:
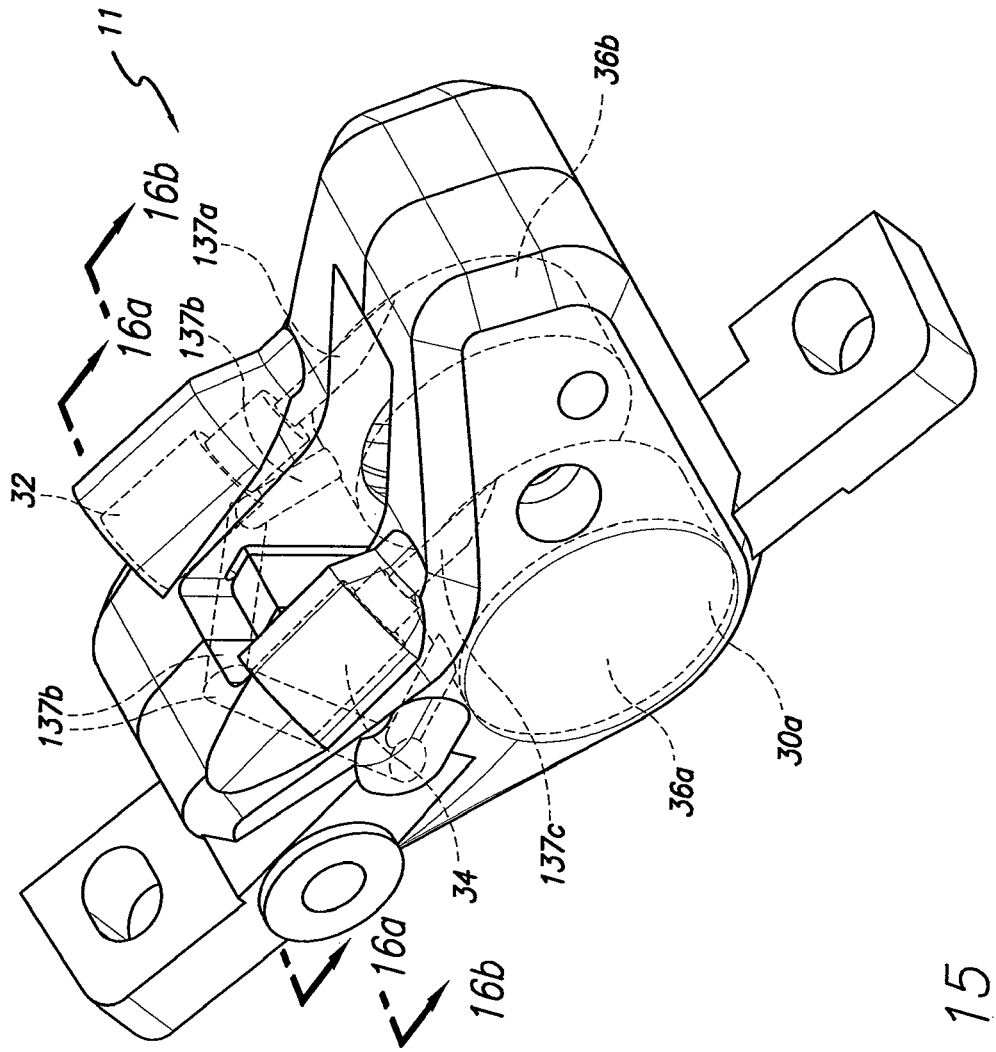
FIG. 15 is a perspective view of the disc brake caliper of FIG. 14 showing the conduits and ports in hidden lines.

Described in another way, and illustrated in FIG. 13, the fluid path through the caliper 11 is generally U-shaped. First conduit 37a is the first leg of the generally U-shaped fluid path, second conduit 37b is the second leg of the generally U-shaped path, and third conduit 37c is the third leg of the generally U-shaped fluid path. And, the first port 36a is part of the first leg of the generally U-shaped fluid path and the second port 36b is a part of the third leg of the generally U-shaped fluid path.

As is shown in FIG. 11, the first conduit 37a extends from the second conduit 37b at a non-right angle. This is due to the placement of the feet for mounting the caliper 11 to the frame. In another embodiment, the feet can be moved and the first conduit 37a cab extend from the second conduit 37b at a right angle. Similarly, third conduit 37c can extend from the second conduit 37b at a right or non-right angle.

This arrangement of the conduits 37 makes the entire brake system (from caliper to lever assembly) easier to bleed than the prior art. As described above, many prior art systems have branched conduit networks. In other words, the fluid enters through an inlet and then branches to the pistons on either side of the rotor. In the present invention, the conduit network 37 provides for one-way, continuous fluid flow with no branches. As shown by the solid arrows in FIG. 12, this provides a one-way path when filling the caliper 20 with fluid. And, as shown by the dashed arrows in FIG. 12, this provides a one-way path for bleeding air/gas, which allows the air/gas to be more easily removed from the fluid in the braking system. For example, the brake system bleeding technique taught in the SAINT Braking System Technical Service Instructions (SI-8CZ0E), published by Shimano Inc. in May, 2005, the entirety of which is incorporated herein by reference, can be used to bleed the brakes. Due to the one-way plumbing, the fluid around the piston closest to the bleed valve (second opening 34) will be bled first, followed by the other piston. It will be understood that, as used herein, one-way does not mean that the fluid can only move in one direction, but it means that the plumbing or conduit system is not branched. Fluid going into the piston receiving openings 36 is not considered a branch.

With reference to FIGS. 14-17 another embodiment of a caliper 11 is shown. It will be understood that the components of caliper 11 shown in FIGS. 14-17 are generally the same as caliper 11 shown in FIGS. 4-13, but that the conduit system is different, as described below.

Figure 16A:
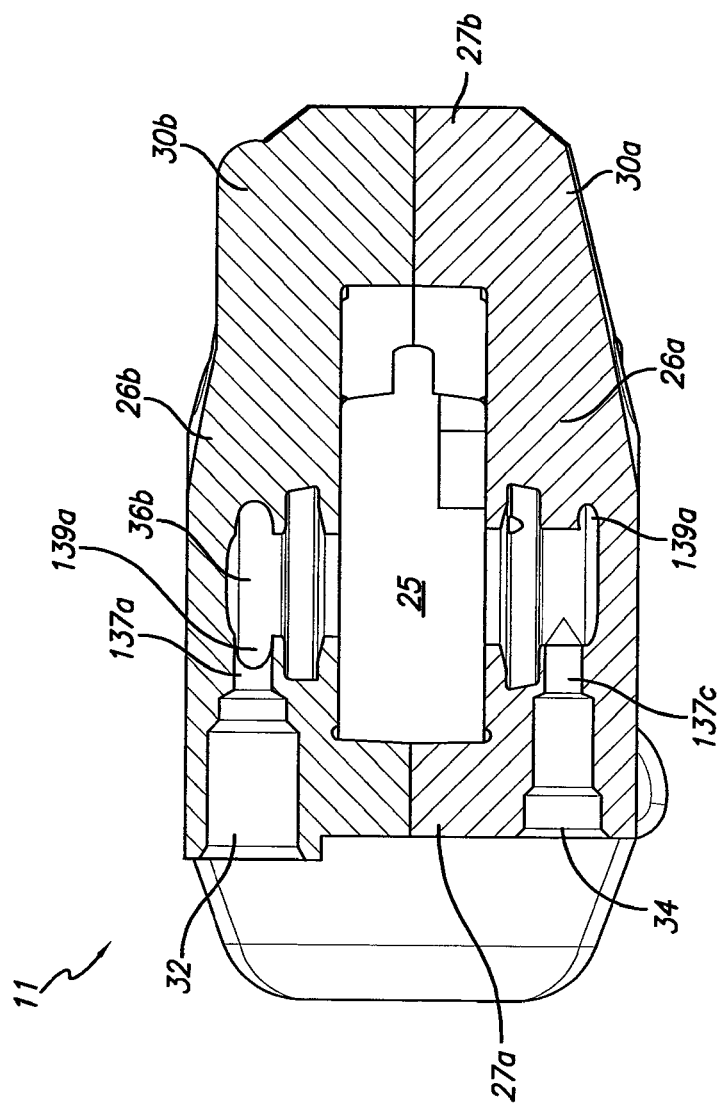
FIG. 16a is a cross-sectional top plan view of the disc brake caliper of FIG. 14 taken along line 16a-16a of FIG. 15.
Figure 16B:
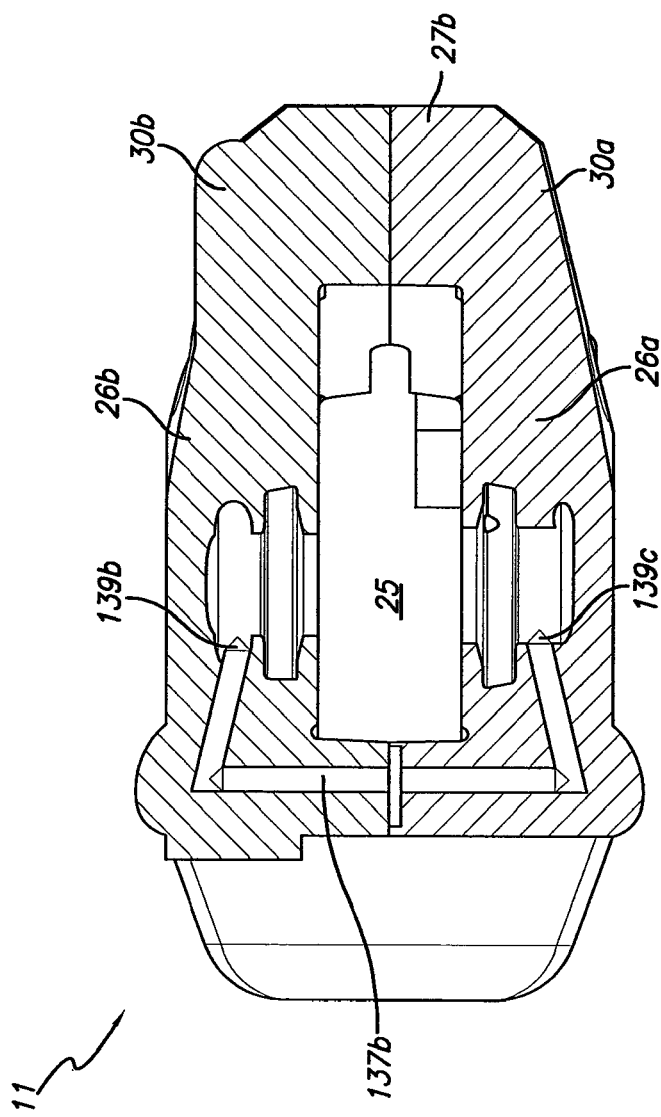
FIG. 16b is a cross-sectional top plan view of the disc brake caliper of FIG. 14 taken along line 16b-16b of FIG. 15.

Generally, as is shown in FIGS. 16a and 16b, the assembled caliper housing 20 is comprised of four sections or portions, first and second side portions 26a and 26b and first and second end portions 27a and 27b, that cooperate to define a braking opening 25.

Piston receiving openings 36a and 36b are in fluid communication with the fluid coupling unit and a bleed valve (not shown) (via first and second holes 32 and 34) via a network of fluid conduits 137. Thus, when actuating/hydraulic fluid is supplied to caliper housing 20, the actuating fluid flows through the network of conduits 137a, 137b and 137c and into the piston receiving openings 36. For ease of description and because the conduits 137a, 137b and 137c operate in generally the same manner, the conduits may be referred to herein generically without the "a," "b," etc. suffix. For example, the conduits may be referred to individually as first conduit 137a, second conduit 137b, third conduit 137c or they may be referred to generically as conduit(s) 137.

As shown in FIG. 16a, first conduit 137a extends from first hole 32 (starting in the second side portion), and passes into piston receiving opening 36b through opening 139a. As shown in FIG. 16b, the second conduit 137b extends out of piston receiving opening 36b through opening 139b and into first end portion 27a. Conduit 137b then extends from first end portion 27a into first side portion 26a and into piston receiving opening 36a through opening 139c. It will be understood that a portion of second conduit 137b is defined in first caliper housing half 30a and another portion of second conduit 137b is defined in second caliper housing half 30b. As shown in FIG. 16a, the third conduit 137c extends out of piston receiving opening 36a through opening 139d and to the second hole 34. It will be understood that all of the conduits 137 and piston receiving openings 36 are in fluid flow communication with one another and define a fluid path.

As shown in FIGS. 16a and 16b, when filling the caliper 11 with fluid, fluid is flowed into first opening 32, through first conduit 137a, into and out of piston receiving opening 36b through openings 139a and 139b, through second conduit 137b, into and out of piston receiving opening 36a through openings 139c and 139d, through third conduit 137c and to second opening 34. It will be understood that caliper 11 can be filled with fluid in the opposite direction. In other words, fluid can be flowed into second opening 34, through the conduits 137 and to the first opening 32.

Figure 17:
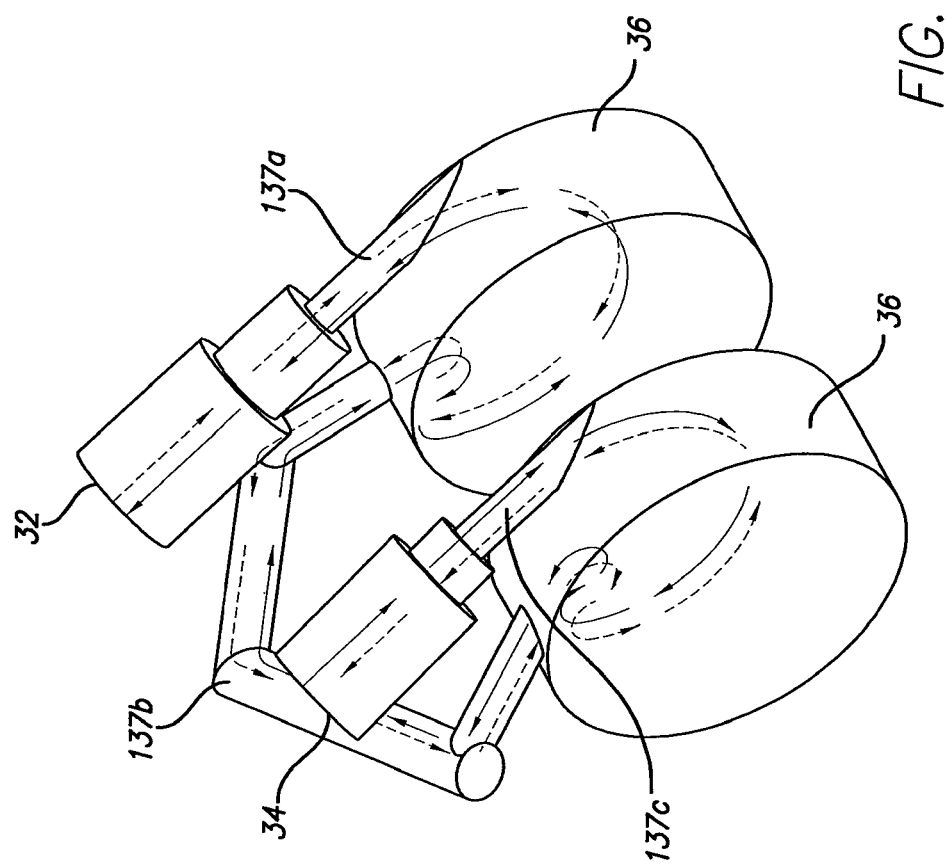
FIG. 17 is a schematic showing the fluid path in the conduits of the disc brake caliper of FIG. 14.

The fluid path is illustrated in FIG. 17. First conduit 137a is the first leg of the fluid path, second conduit 137b is the second leg of the fluid path, and third conduit 37c is the third leg of the fluid path. And, the second port 36b is between the first and second legs of the fluid path and the first port 36a is between the second and third legs of the fluid path.

This arrangement of the conduits 137 makes the entire brake system (from caliper to lever assembly) easier to bleed than the prior art. As described above, many prior art systems have branched conduit networks. In other words, the fluid enters through an inlet and then branches to the pistons on either side of the rotor. In the present invention, the conduit network 137 provides for one-way, continuous fluid flow with no branches. As shown by the dashed arrows in FIG. 17, this provides a one-way path when filling the caliper 11 with fluid. And, as shown by the solid arrows in FIG. 17, this provides a one-way path for bleeding air/gas, which allows the air/gas to be more easily removed from the fluid in the braking system. As discussed above, these paths can be reversed and the bleed valve can be placed on first opening 32 and the inlet from the master cylinder can be second opening 34. For example, the brake system bleeding technique taught in the SAINT Braking System Technical Service Instructions (SI-8CZ0E) described above can be used here as well. Due to the one-way plumbing, the fluid around the piston closest to the bleed valve will be bled first, followed by the other piston. It will be understood that, as used herein, one-way does not mean that the fluid can only move in one direction, but it means that the plumbing or conduit system is not branched. Fluid going into the piston receiving openings 36 is not considered a branch.

Referring again to FIGS. 1-3, brake operating mechanisms 28a and 28b are conventional disc brake operating mechanisms. Therefore, brake operating mechanisms 28a and 28b will not be discussed or illustrated in detail herein. It will be understood that the calipers shown in FIGS. 1-3 are for illustrative purposes only. Brake operating mechanisms 28a and 28b are provided to control disc brake assemblies 12 and 14. Brake operating mechanisms 28a and 28b are preferably fixedly mounted on handle bar 19 adjacent the hand portions of handle bar 19. Accordingly, brake operating mechanisms 28a and 28b are operated in a conventional manner such that disc brake assemblies 12 and 14 move friction members from a release position in which bicycle wheels 16 and the disc brake rotors 18 are free to rotate, and a braking position. In the braking position, disc brake assemblies 12 and 14 apply a braking force against disc brake rotor 18 to stop rotation of bicycle wheels 16 and disc brake rotors 18.

Brake operating mechanisms 28a and 28b will now be described in more detail. Basically, brake operating mechanisms 28a and 28b are designed to actuate the disc brake assemblies 12 and 14 in a conventional manner to apply a forcible gripping action on disc brake rotor 18 to stop rotation of one of the front wheels 16. Brake operating mechanism 28b actuates rear disc brake assembly 14 and brake operating mechanism 28a actuates front disc brake assembly 12. Brake operating mechanism 28b is identical to brake operating mechanism 28a except brake operating mechanism 28b is a mirror image of brake operating mechanism 28a. Each of the brake operating mechanisms 28a and 28b basically includes a brake lever 80, a hydraulic or master cylinder 81, a hydraulic or master piston 82, and an actuation fluid reservoir 83. Preferably, each of the brake operating mechanisms 28a and 28b is a single unit, which is mounted on handlebar 19.

In particular, referring to either one of the brake operating mechanisms 28a and 28b, brake lever 80 includes a mounting portion 84 and a lever portion 85. Mounting portion 84 is designed to be clamped onto handle bar 19 in a conventional manner. Mounting portion 84 is integrally formed with master cylinder 81 such that master cylinder 81, master piston 82 and actuation fluid reservoir 83 are all supported on mounting portion 84 of brake lever 80. Lever portion 85 is pivotally coupled to mounting portion 84 for movement between a release position and a braking position. Normally, lever portion 84 is maintained in a release position in a conventional manner.

Master piston 82 is movably mounted within master cylinder 81 in a conventional manner. More specifically, actuation fluid reservoir 83 is mounted on master cylinder 81 and is in fluid communication with the interior bore of master cylinder 81 for supplying actuation fluid thereto. Master piston 82 is connected at one end to lever portion 85 for axially moving master piston 82 within master cylinder 81. Accordingly, actuation of lever portion 85 causes master piston 82 to move axially within master cylinder 81. This movement of master piston 82 within master cylinder 81 directs fluid pressure through a hydraulic line 86 which is coupled to one of the disc brake assemblies 12 and 14 via fluid coupling units 33. Thus, the pressurized actuating fluid causes the pistons 24 and friction members to move so as to engage disc brake rotors 18 to stop rotation of wheels 16.

It will be understood that due to the reversibility of the fluid path described above, regardless of which housing half, side portion, end portion, conduit, port, piston receiving opening, etc. is designated as "first" or "second" in the specification, that when reading the claims below, either of the housing halves, side portions, end portions, conduits, ports, piston receiving openings, etc. can be considered "first" or "second." The specific one designated as "first" or "second" in the drawings is not a limitation on the present invention.

The embodiments described above are exemplary embodiments of a the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A hydraulic disc brake caliper housing for a bicycle having a frame comprising: first and second side portions and first and second end portions that cooperate to define a fluid path defined therein that extends between a fluid inlet and a fluid outlet, wherein the first side portion has at least a first piston receiving opening defined therein and the second side portion has at least a second piston receiving opening defined therein that opposes the first piston receiving opening, wherein the fluid path is defined such that when fluid enters the fluid inlet, the fluid flows through the first side portion, then through the first piston receiving opening, then through the first end portion, then through the second side portion, then through the second piston receiving opening and then to the fluid outlet, wherein the housing defines an outside boundary, wherein the entire fluid path is defined within the housing and does not extend outside of the outside boundary, and, within the housing, fluid can not flow outside the fluid path, wherein the fluid inlet is located on the second side portion and the fluid outlet is located in the first side portion.

2. A method of filling a hydraulic disc brake caliper for a bicycle with a frame with hydraulic fluid, the method comprising the steps of:

(a) providing a hydraulic disc brake caliper that comprises a housing that includes first and second side portions and first and second end portions that cooperate to define a fluid path defined therein that extends between a fluid inlet and a fluid outlet, wherein the first side portion has at least a first piston receiving opening defined therein and the second side portion has at least a second piston receiving opening defined therein that opposes the first piston receiving opening, wherein the housing defines an outside boundary, and wherein the entire fluid path is defined within the housing and does not extend outside of the outside boundary, and (b) flowing fluid through the fluid inlet, then directly into and out of the first piston receiving opening, then through the first end portion, then into and out of the second piston receiving opening and then toward the outlet and, within the housing, fluid does not flow outside the fluid path bleeding gas from the fluid in the fluid path, wherein during this step at least a portion of the gas travels from adjacent the fluid outlet, through the second piston receiving opening, through the first piston receiving opening and out the fluid inlet.

* * * * *